(12) United States Patent
Lee et al.

(10) Patent No.: US 10,506,491 B2
(45) Date of Patent: Dec. 10, 2019

(54) METHOD AND APPARATUS FOR TRANSMITTING RELAY REQUEST INDICATION IN WIRELESS COMMUNICATION SYSTEM

(71) Applicant: LG ELECTRONICS INC., Seoul (KR)

(72) Inventors: Jaewook Lee, Seoul (KR); Youngdae Lee, Seoul (KR); Sunghoon Jung, Seoul (KR)

(73) Assignee: LG Electronics Inc., Seoul (KR)

(*) Notice: Subject to any disclaimer, the term of this patent is extended or adjusted under 35 U.S.C. 154(b) by 4 days.

(21) Appl. No.: 15/564,485

(22) PCT Filed: Apr. 6, 2016

(86) PCT No.: PCT/KR2016/003567
§ 371 (c)(1),
(2) Date: Oct. 5, 2017

(87) PCT Pub. No.: WO2016/163733
PCT Pub. Date: Oct. 13, 2016

(65) Prior Publication Data
US 2018/0084478 A1    Mar. 22, 2018

Related U.S. Application Data

(60) Provisional application No. 62/143,217, filed on Apr. 6, 2015.

(51) Int. Cl.
*H04W 40/12* (2009.01)
*H04W 40/22* (2009.01)
(Continued)

(52) U.S. Cl.
CPC .......... *H04W 40/12* (2013.01); *H04W 28/12* (2013.01); *H04W 40/22* (2013.01);
(Continued)

(58) Field of Classification Search
CPC ..... H04W 40/12; H04W 28/12; H04W 40/22; H04W 72/0406; H04W 88/04;
(Continued)

(56) References Cited

U.S. PATENT DOCUMENTS

2007/0160014 A1* 7/2007 Larsson ................ H04B 7/022
370/338
2009/0219852 A1* 9/2009 Youn ...................... H04L 45/00
370/315
(Continued)

OTHER PUBLICATIONS

3rd Generation Partnership Project; Technical Specification Group Radio Access Network; Evolved Universal Terrestrial Radio Access (E-UTRA); Physical layer; Measurements (Release 12), 3GPP TS 36.214 V12.2.0, pp. 1-17, (Mar. 2015), hereinafter 3GPP ( Year: 2015).*
(Continued)

*Primary Examiner* — Wutchung Chu
(74) *Attorney, Agent, or Firm* — Dentons US LLP

(57) ABSTRACT

A method and apparatus for selecting a relay UE in a wireless communication system is provided. A remote UE selects a relay UE whose measured channel quality with the remote UE satisfies a condition based on a threshold, and transmits data, which is required to be relayed by the relay UE to a network, to the relay UE.

8 Claims, 13 Drawing Sheets

(51) Int. Cl.
*H04W 28/12* (2009.01)
*H04W 88/04* (2009.01)
*H04W 72/04* (2009.01)

(52) U.S. Cl.
CPC ........ *H04W 72/0406* (2013.01); *H04W 88/04* (2013.01); *Y02D 70/00* (2018.01); *Y02D 70/1224* (2018.01); *Y02D 70/1226* (2018.01); *Y02D 70/1242* (2018.01); *Y02D 70/1262* (2018.01); *Y02D 70/142* (2018.01); *Y02D 70/146* (2018.01); *Y02D 70/21* (2018.01); *Y02D 70/23* (2018.01); *Y02D 70/24* (2018.01); *Y02D 70/34* (2018.01); *Y02D 70/39* (2018.01)

(58) Field of Classification Search
CPC ........... Y02D 70/1224; Y02D 70/1226; Y02D 70/1242; Y02D 70/1262; Y02D 70/142; Y02D 70/146; Y02D 70/21; Y02D 70/23; Y02D 70/24; Y02D 70/34; Y02D 70/39
See application file for complete search history.

(56) References Cited

U.S. PATENT DOCUMENTS

| | | | |
|---|---|---|---|
| 2013/0223324 A1 | 8/2013 | Somasundaram et al. | |
| 2013/0273838 A1* | 10/2013 | Nagata | H04B 7/155 455/9 |
| 2017/0359766 A1* | 12/2017 | Agiwal | H04W 76/14 |
| 2018/0027429 A1* | 1/2018 | Li | H04W 40/22 455/426.1 |
| 2018/0092017 A1* | 3/2018 | Freda | H04W 76/14 |
| 2018/0139794 A1* | 5/2018 | Chae | H04W 40/12 |
| 2018/0352411 A1* | 12/2018 | Ryu | H04W 40/24 |

OTHER PUBLICATIONS

Huawei et al. "The ProSe UE-to-network relay with the network authorization", S2-133281, SA WG2 Meeting #99, Xiamen, China, Sep. 18, 2013, pp. 1-5.

LG Electronics, "Pre-configured ProSe UE-to-Network Relay solution",S2-140650, SA WG2 Meeting #101bis, San Jose Del Cabo, Mexico, Feb. 12, 2014, pp. 1-4.

LG Electronics, "Threshold control for ProSe UE-to-Network Relay", S2-140641, SA WG2 Meeting #101bis, San Jose Del Cabo, Mexico, Feb. 12, 2014, pp. 1-3.

Ericsson, "UE-to-network relay security for ProSe", S3-151186, 3GPP TSG-SA WG3 Meeting #78, Sorrento, Italy, Jan. 30, 2015, pp. 1-6.

* cited by examiner

METHOD AND APPARATUS FOR TRANSMITTING RELAY REQUEST INDICATION IN WIRELESS COMMUNICATION SYSTEM

CROSS-REFERENCE TO RELATED APPLICATIONS

This application is the National Stage filing under 35 U.S.C. 371 of International Application No. PCT/KR2016/003567, filed on Apr. 6, 2016, which claims the benefit of U.S. Provisional Application No. 62/143,217 filed on Apr. 6, 2015, the contents of which are all hereby incorporated by reference herein in their entirety.

BACKGROUND OF THE INVENTION

Field of the Invention

The present invention relates to wireless communications, and more particularly, to a method and apparatus for transmitting a relay request indication in a wireless communication system.

Related Art

3rd generation partnership project (3GPP) long-term evolution (LTE) is a technology for enabling high-speed packet communications. Many schemes have been proposed for the LTE objective including those that aim to reduce user and provider costs, improve service quality, and expand and improve coverage and system capacity. The 3GPP LTE requires reduced cost per bit, increased service availability, flexible use of a frequency band, a simple structure, an open interface, and adequate power consumption of a terminal as an upper-level requirement.

Recently, there has been a surge of interest in supporting proximity-based services (ProSe). Proximity is determined ("a user equipment (UE) is in proximity of another UE") when given proximity criteria are fulfilled. This new interest is motivated by several factors driven largely by social networking applications, and the crushing data demands on cellular spectrum, much of which is localized traffic, and the under-utilization of uplink frequency bands. 3GPP is targeting the availability of ProSe in LTE rel-12 to enable LTE become a competitive broadband communication technology for public safety networks, used by first responders. Due to the legacy issues and budget constraints, current public safety networks are still mainly based on obsolete 2G technologies while commercial networks are rapidly migrating to LTE. This evolution gap and the desire for enhanced services have led to global attempts to upgrade existing public safety networks. Compared to commercial networks, public safety networks have much more stringent service requirements (e.g., reliability and security) and also require direct communication, especially when cellular coverage fails or is not available. This essential direct mode feature is currently missing in LTE.

By using concept of ProSe function, the extension of network coverage using L3-based UE-to-Network Relay and/or UE-to-UE Relay have been discussed. For UE-to-Network Relay and/or UE-to-UE Relay, some operations for UE which transmits data to be relayed and for UE which performs function of relaying may be required to be defined.

SUMMARY OF THE INVENTION

The present invention provides a method and apparatus for transmitting a relay request indication in a wireless communication system. The present invention provides a method and apparatus for selecting a relay UE which relays data received from a remote UE to a network or other UEs.

In an aspect, a method for selecting, by a remote UE, a relay UE in a wireless communication system is provided. The method includes selecting a relay UE whose measured channel quality with the remote UE satisfies a condition based on a threshold, and transmitting data, which is required to be relayed by the relay UE to a network, to the relay UE.

The condition may include that the measured channel quality with the remote UE for a candidate relay UE exceeds the threshold. The relay UE may be selected among all candidate relay UEs whose measured channel quality with the remote UE satisfy the condition based on the threshold. The relay UE may have the best measured channel quality among all the candidate relay UEs. The measured channel quality may be a sidelink reference signal received power (S-RSRP). The threshold may be pre-configured or provided by the network.

In another aspect, a method for receiving, by a relay UE, an indication in a wireless communication system is provided. The method includes receiving data and an indication which indicates whether the data is required to be relayed from a remote UE, and determining whether to relay the received data according to the received indication.

In another aspect, a method for receiving, by a relay UE, an indication in a wireless communication system is provided. The method includes receiving data and an indication which indicates which relay UE is in charge of relaying the data from a remote UE, and determining whether the relay UE itself is in charge of relaying the received data according to the received indication.

UE-to-Network Relay or UE-to-UE Relay can be performed efficiently.

DESCRIPTION OF EXEMPLARY EMBODIMENTS

The technology described below can be used in various wireless communication systems such as code division multiple access (CDMA), frequency division multiple access (FDMA), time division multiple access (TDMA), orthogonal frequency division multiple access (OFDMA), single carrier frequency division multiple access (SC-FDMA), etc. The CDMA can be implemented with a radio technology such as universal terrestrial radio access (UTRA) or CDMA-2000. The TDMA can be implemented with a radio technology such as global system for mobile communications (GSM)/general packet ratio service (GPRS)/enhanced data rate for GSM evolution (EDGE). The OFDMA can be implemented with a radio technology such as institute of electrical and electronics engineers (IEEE) 802.11 (Wi-Fi), IEEE 802.16 (WiMAX), IEEE 802-20, evolved UTRA (E-UTRA), etc. IEEE 802.16m is an evolution of IEEE 802.16e, and provides backward compatibility with an IEEE 802.16-based system. The UTRA is a part of a universal mobile telecommunication system (UMTS). 3rd generation partnership project (3GPP) long term evolution (LTE) is a part of an evolved UMTS (E-UMTS) using the E-UTRA. The 3GPP LTE uses the OFDMA in downlink and uses the SC-FDMA in uplink. LTE-advance (LTE-A) is an evolution of the 3GPP LTE.

For clarity, the following description will focus on the LTE-A. However, technical features of the present invention are not limited thereto.

Figure 1:
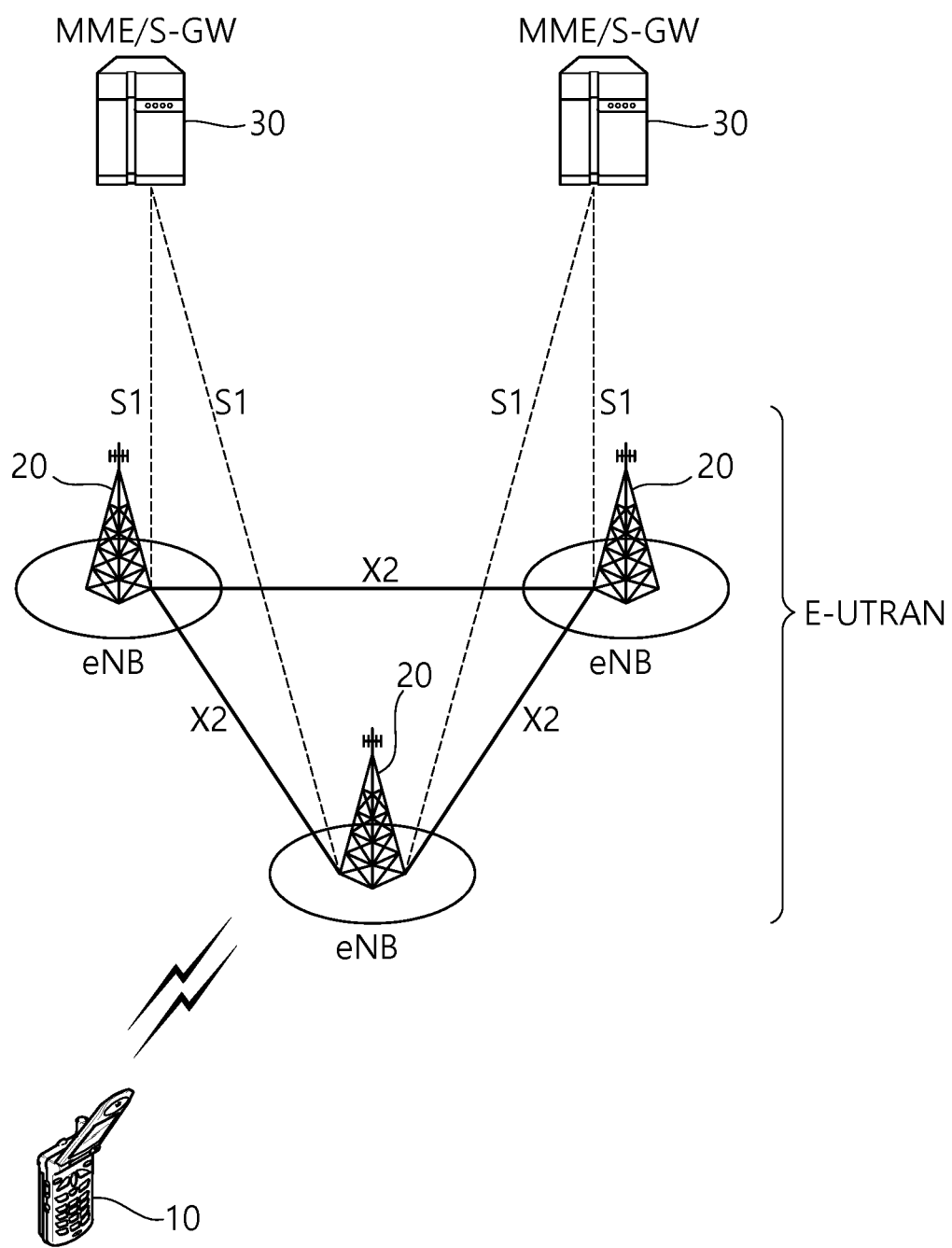
FIG. 1 shows LTE system architecture.

FIG. 1 shows LTE system architecture. The communication network is widely deployed to provide a variety of communication services such as voice over internet protocol (VoIP) through IMS and packet data.

Referring to FIG. 1, the LTE system architecture includes one or more user equipment (UE; 10), an evolved-UMTS terrestrial radio access network (E-UTRAN) and an evolved packet core (EPC). The UE 10 refers to a communication equipment carried by a user. The UE 10 may be fixed or mobile, and may be referred to as another terminology, such as a mobile station (MS), a user terminal (UT), a subscriber station (SS), a wireless device, etc.

The E-UTRAN includes one or more evolved node-B (eNB) 20, and a plurality of UEs may be located in one cell. The eNB 20 provides an end point of a control plane and a user plane to the UE 10. The eNB 20 is generally a fixed station that communicates with the UE 10 and may be referred to as another terminology, such as a base station (BS), an access point, etc. One eNB 20 may be deployed per cell.

Hereinafter, a downlink (DL) denotes communication from the eNB 20 to the UE 10, and an uplink (UL) denotes communication from the UE 10 to the eNB 20. In the DL, a transmitter may be a part of the eNB 20, and a receiver may be a part of the UE 10. In the UL, the transmitter may be a part of the UE 10, and the receiver may be a part of the eNB 20.

The EPC includes a mobility management entity (MME) and a system architecture evolution (SAE) gateway (S-GW). The MME/S-GW 30 may be positioned at the end of the network and connected to an external network. For clarity, MME/S-GW 30 will be referred to herein simply as a "gateway," but it is understood that this entity includes both the MME and S-GW.

The MME provides various functions including non-access stratum (NAS) signaling to eNBs 20, NAS signaling security, access stratum (AS) security control, inter core network (CN) node signaling for mobility between 3GPP access networks, idle mode UE reachability (including control and execution of paging retransmission), tracking area list management (for UE in idle and active mode), packet data network (PDN) gateway (P-GW) and S-GW selection, MME selection for handovers with MME change, serving GPRS support node (SGSN) selection for handovers to 2G or 3G 3GPP access networks, roaming, authentication, bearer management functions including dedicated bearer establishment, support for public warning system (PWS) (which includes earthquake and tsunami warning system (ETWS) and commercial mobile alert system (CMAS)) message transmission. The S-GW host provides assorted functions including per-user based packet filtering (by e.g., deep packet inspection), lawful interception, UE Internet protocol (IP) address allocation, transport level packet marking in the DL, UL and DL service level charging, gating and rate enforcement, DL rate enforcement based on access point name aggregate maximum bit rate (APN-AMBR).

Interfaces for transmitting user traffic or control traffic may be used. The UE 10 is connected to the eNB 20 via a Uu interface. The eNBs 20 are connected to each other via an X2 interface. Neighboring eNBs may have a meshed network structure that has the X2 interface. A plurality of nodes may be connected between the eNB 20 and the gateway 30 via an S1 interface.

Figure 2:
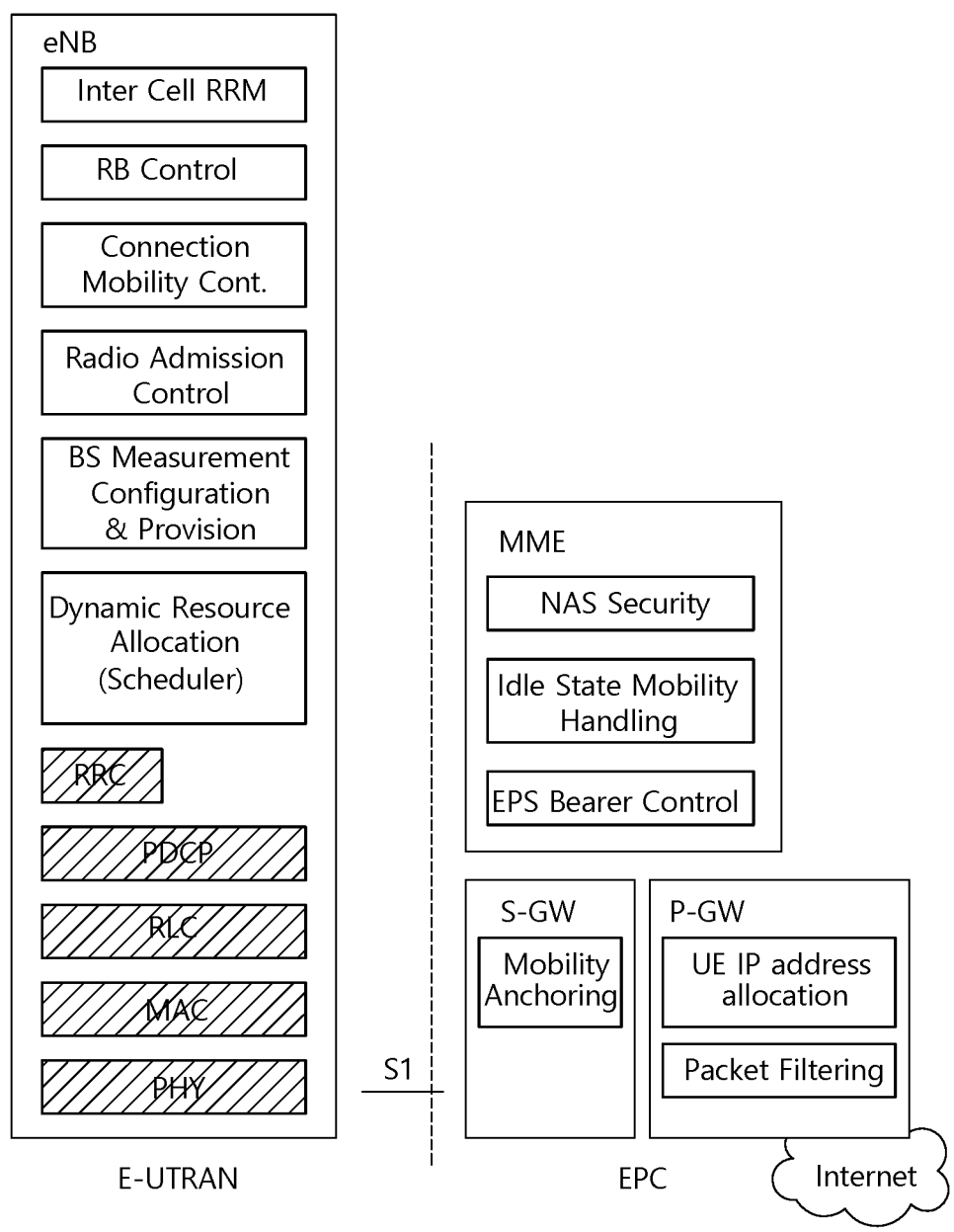
FIG. 2 shows a block diagram of architecture of a typical E-UTRAN and a typical EPC.

FIG. 2 shows a block diagram of architecture of a typical E-UTRAN and a typical EPC. Referring to FIG. 2, the eNB 20 may perform functions of selection for gateway 30, routing toward the gateway 30 during a radio resource control (RRC) activation, scheduling and transmitting of paging messages, scheduling and transmitting of broadcast channel (BCH) information, dynamic allocation of resources to the UEs 10 in both UL and DL, configuration and provisioning of eNB measurements, radio bearer control, radio admission control (RAC), and connection mobility control in LTE_ACTIVE state. In the EPC, and as noted above, gateway 30 may perform functions of paging origination, LTE_IDLE state management, ciphering of the user plane, SAE bearer control, and ciphering and integrity protection of NAS signaling.

Figure 3:
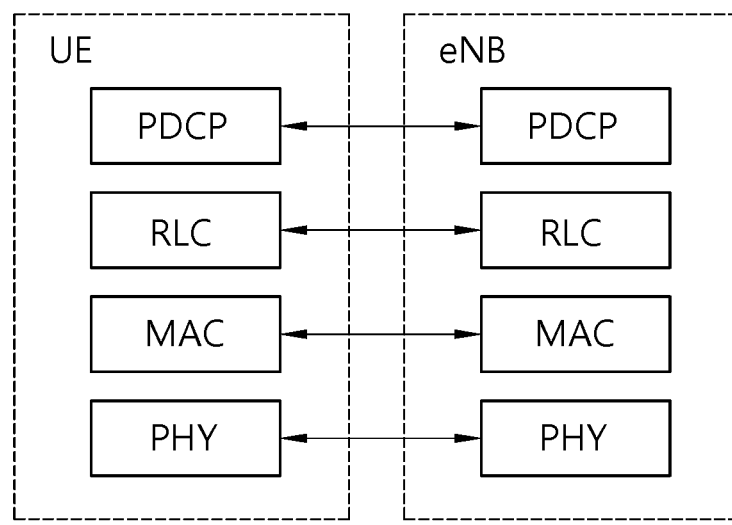
FIG. 3 shows a block diagram of a user plane protocol stack of an LTE system.
Figure 4:
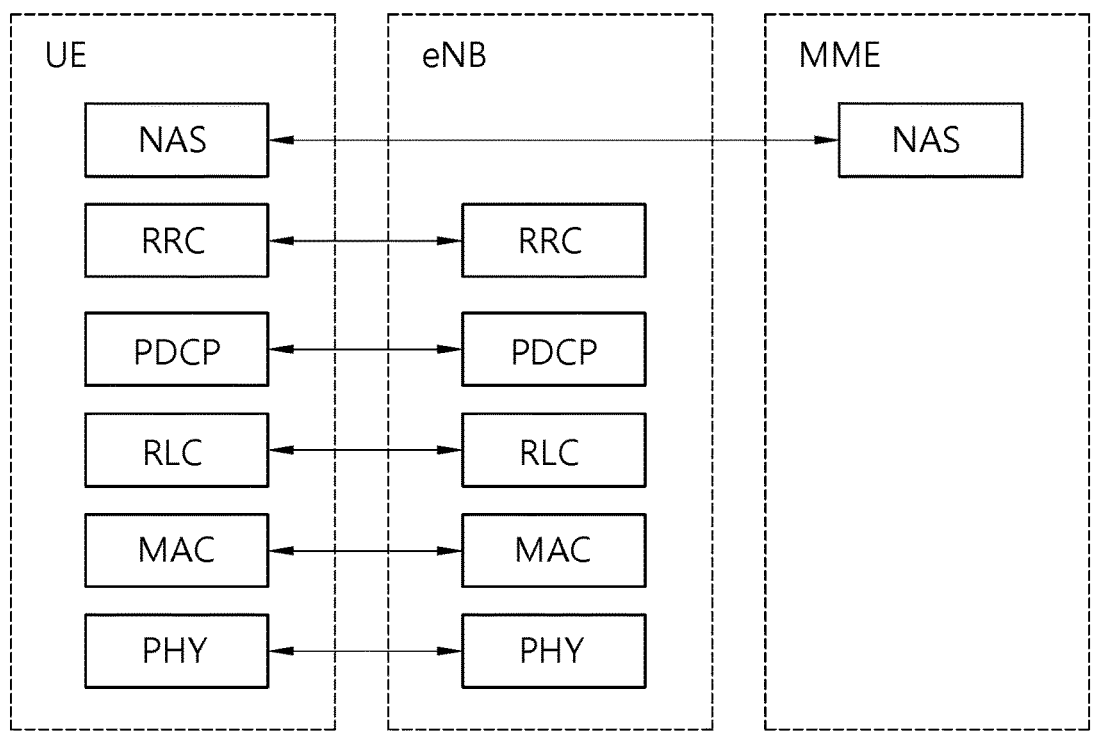
FIG. 4 shows a block diagram of a control plane protocol stack of an LTE system.

FIG. 3 shows a block diagram of a user plane protocol stack of an LTE system. FIG. 4 shows a block diagram of a control plane protocol stack of an LTE system. Layers of a radio interface protocol between the UE and the E-UTRAN may be classified into a first layer (L1), a second layer (L2), and a third layer (L3) based on the lower three layers of the open system interconnection (OSI) model that is well-known in the communication system.

A physical (PHY) layer belongs to the L1. The PHY layer provides a higher layer with an information transfer service through a physical channel. The PHY layer is connected to a medium access control (MAC) layer, which is a higher layer of the PHY layer, through a transport channel. A physical channel is mapped to the transport channel. Data between the MAC layer and the PHY layer is transferred through the transport channel. Between different PHY layers, i.e. between a PHY layer of a transmission side and a PHY layer of a reception side, data is transferred via the physical channel.

A MAC layer, a radio link control (RLC) layer, and a packet data convergence protocol (PDCP) layer belong to the L2. The MAC layer provides services to the RLC layer, which is a higher layer of the MAC layer, via a logical channel. The MAC layer provides data transfer services on logical channels. The RLC layer supports the transmission of data with reliability. Meanwhile, a function of the RLC layer may be implemented with a functional block inside the MAC layer. In this case, the RLC layer may not exist. The PDCP layer provides a function of header compression function that reduces unnecessary control information such that data being transmitted by employing IP packets, such as IPv4 or IPv6, can be efficiently transmitted over a radio interface that has a relatively small bandwidth.

A radio resource control (RRC) layer belongs to the L3. The RLC layer is located at the lowest portion of the L3, and is only defined in the control plane. The RRC layer controls logical channels, transport channels, and physical channels in relation to the configuration, reconfiguration, and release of radio bearers (RBs). The RB signifies a service provided the L2 for data transmission between the UE and E-UTRAN.

Referring to FIG. 3, the RLC and MAC layers (terminated in the eNB on the network side) may perform functions such as scheduling, automatic repeat request (ARQ), and hybrid ARQ (HARQ). The PDCP layer (terminated in the eNB on the network side) may perform the user plane functions such as header compression, integrity protection, and ciphering.

Referring to FIG. 4, the RLC and MAC layers (terminated in the eNB on the network side) may perform the same functions for the control plane. The RRC layer (terminated in the eNB on the network side) may perform functions such as broadcasting, paging, RRC connection management, RB control, mobility functions, and UE measurement reporting and controlling. The NAS control protocol (terminated in the MME of gateway on the network side) may perform functions such as a SAE bearer management, authentication, LTE_IDLE mobility handling, paging origination in LTE_IDLE, and security control for the signaling between the gateway and UE.

Figure 5:
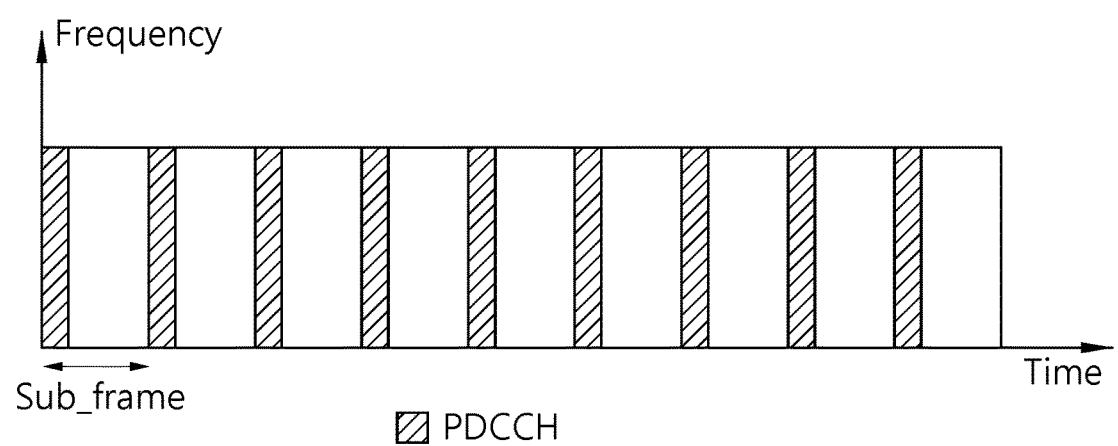
FIG. 5 shows an example of a physical channel structure.

FIG. 5 shows an example of a physical channel structure. A physical channel transfers signaling and data between PHY layer of the UE and eNB with a radio resource. A physical channel consists of a plurality of subframes in time domain and a plurality of subcarriers in frequency domain. One subframe, which is 1 ms, consists of a plurality of symbols in the time domain. Specific symbol(s) of the subframe, such as the first symbol of the subframe, may be used for a physical downlink control channel (PDCCH). The PDCCH carries dynamic allocated resources, such as a physical resource block (PRB) and modulation and coding scheme (MCS).

A DL transport channel includes a broadcast channel (BCH) used for transmitting system information, a paging channel (PCH) used for paging a UE, a downlink shared channel (DL-SCH) used for transmitting user traffic or control signals, a multicast channel (MCH) used for multicast or broadcast service transmission. The DL-SCH supports HARQ, dynamic link adaptation by varying the modulation, coding and transmit power, and both dynamic and semi-static resource allocation. The DL-SCH also may enable broadcast in the entire cell and the use of beamforming.

A UL transport channel includes a random access channel (RACH) normally used for initial access to a cell, a uplink shared channel (UL-SCH) for transmitting user traffic or control signals, etc. The UL-SCH supports HARQ and dynamic link adaptation by varying the transmit power and potentially modulation and coding. The UL-SCH also may enable the use of beamforming.

The logical channels are classified into control channels for transferring control plane information and traffic channels for transferring user plane information, according to a type of transmitted information. That is, a set of logical channel types is defined for different data transfer services offered by the MAC layer.

The control channels are used for transfer of control plane information only. The control channels provided by the MAC layer include a broadcast control channel (BCCH), a paging control channel (PCCH), a common control channel (CCCH), a multicast control channel (MCCH) and a dedicated control channel (DCCH). The BCCH is a downlink channel for broadcasting system control information. The PCCH is a downlink channel that transfers paging information and is used when the network does not know the location cell of a UE. The CCCH is used by UEs having no RRC connection with the network. The MCCH is a point-to-multipoint downlink channel used for transmitting multimedia broadcast multicast services (MBMS) control information from the network to a UE. The DCCH is a point-to-point bi-directional channel used by UEs having an RRC connection that transmits dedicated control information between a UE and the network.

Traffic channels are used for the transfer of user plane information only. The traffic channels provided by the MAC layer include a dedicated traffic channel (DTCH) and a multicast traffic channel (MTCH). The DTCH is a point-to-point channel, dedicated to one UE for the transfer of user information and can exist in both uplink and downlink. The MTCH is a point-to-multipoint downlink channel for transmitting traffic data from the network to the UE.

Uplink connections between logical channels and transport channels include the DCCH that can be mapped to the UL-SCH, the DTCH that can be mapped to the UL-SCH and the CCCH that can be mapped to the UL-SCH. Downlink connections between logical channels and transport channels include the BCCH that can be mapped to the BCH or DL-SCH, the PCCH that can be mapped to the PCH, the DCCH that can be mapped to the DL-SCH, and the DTCH that can be mapped to the DL-SCH, the MCCH that can be mapped to the MCH, and the MTCH that can be mapped to the MCH.

An RRC state indicates whether an RRC layer of the UE is logically connected to an RRC layer of the E-UTRAN. The RRC state may be divided into two different states such as an RRC idle state (RRC_IDLE) and an RRC connected state (RRC_CONNECTED). In RRC_IDLE, the UE may receive broadcasts of system information and paging information while the UE specifies a discontinuous reception (DRX) configured by NAS, and the UE has been allocated an identification (ID) which uniquely identifies the UE in a tracking area and may perform public land mobile network (PLMN) selection and cell re-selection. Also, in RRC_IDLE, no RRC context is stored in the eNB.

In RRC_CONNECTED, the UE has an E-UTRAN RRC connection and a context in the E-UTRAN, such that transmitting and/or receiving data to/from the eNB becomes possible. Also, the UE can report channel quality information and feedback information to the eNB. In RRC_CONNECTED, the E-UTRAN knows the cell to which the UE belongs. Therefore, the network can transmit and/or receive data to/from UE, the network can control mobility (handover and inter-radio access technologies (RAT) cell change order to GSM EDGE radio access network (GERAN) with network assisted cell change (NACC)) of the UE, and the network can perform cell measurements for a neighboring cell.

In RRC_IDLE, the UE specifies the paging DRX cycle. Specifically, the UE monitors a paging signal at a specific paging occasion of every UE specific paging DRX cycle. The paging occasion is a time interval during which a paging signal is transmitted. The UE has its own paging occasion. A paging message is transmitted over all cells belonging to the same tracking area. If the UE moves from one tracking area (TA) to another TA, the UE will send a tracking area update (TAU) message to the network to update its location.

Proximity-based services (ProSe) are described. "ProSe" may be used mixed with "D2D". ProSe direct communication means a communication between two or more UEs in proximity that are ProSe-enabled, by means of user plane transmission using E-UTRA technology via a path not traversing any network node. ProSe-enabled UE means a UE that supports ProSe requirements and associated procedures. Unless explicitly stated otherwise, a ProSe-enabled UE refers both to a non-public safety UE and a public safety UE. ProSe-enabled public safety UE means a ProSe-enabled UE that also supports ProSe procedures and capabilities specific to public safety. ProSe-enabled non-public safety UE means a UE that supports ProSe procedures and but not capabilities specific to public safety. ProSe direct discovery means a procedure employed by a ProSe-enabled UE to discover other ProSe-enabled UEs in its vicinity by using only the capabilities of the two UEs with 3GPP LTE rel-12 technology. EPC-level ProSe discovery means a process by which the EPC determines the proximity of two ProSe-enabled UEs and informs them of their proximity ProSe UE identity (ID) is a unique identity allocated by evolved packet system (EPS) which identifies the ProSe enabled UE. ProSe application ID is an identity identifying application related information for the ProSe enabled UE.

Sidelink is UE to UE interface for ProSe direct communication and ProSe direct discovery. Sidelink comprises ProSe direct discovery and ProSe direct communication between UEs. Sidelink uses UL resources and physical channel structure similar to UL transmissions. Sidelink transmission uses the same basic transmission scheme as the UL transmission scheme. However, sidelink is limited to single cluster transmissions for all the sidelink physical channels. Further, sidelink uses a 1 symbol gap at the end of each sidelink sub-frame.

For mapping between sidelink transport channels and sidelink physical channels, a sidelink discovery channel (SL-DCH) may be mapped to a physical sidelink discovery channel (PSDCH), which carries ProSe direct discovery message from the UE. The SL-DCH is characterized by:
fixed size, pre-defined format periodic broadcast transmission;
support for both UE autonomous resource selection and scheduled resource allocation by eNB;
collision risk due to support of UE autonomous resource selection; no collision when UE is allocated dedicated resources by the eNB.

Further, a sidelink shared channel (SL-SCH) may be mapped to a physical sidelink shared channel (PSSCH), which carries data from a UE for ProSe direct communication. The SL-SCH is characterized by:
support for broadcast transmission;
support for both UE autonomous resource selection and scheduled resource allocation by eNB;
collision risk due to support of UE autonomous resource selection; no collision when UE is allocated dedicated resources by the eNB;
support for HARQ combining, but no support for HARQ feedback;
support for dynamic link adaptation by varying the transmit power, modulation and coding.

Further, a sidelink broadcast channel (SL-BCH) may be mapped to a physical sidelink broadcast channel (PSBCH), which carries system and synchronization related information transmitted from the UE. The SL-BCH is characterized by pre-defined transport format.

A physical sidelink control channel (PSCCH) carries control from a UE for ProSe direct communication. The PSCCH is mapped to the sidelink control resources. The PSCCH indicates resource and other transmission parameters used by a UE for PSSCH.

For mapping between sidelink logical channels and sidelink transport channels for ProSe direct communication, a sidelink broadcast control channel (SBCCH) may be mapped to the SL-BCH. The SBCCH is a sidelink channel for broadcasting sidelink system information from one UE to other UE(s). This channel is used only by ProSe direct communication capable UEs. Further, a sidelink traffic channel (STCH) may be mapped to the SL-SCH. The STCH is a point-to-multipoint channel, for transfer of user information from one UE to other UEs. This channel is used only by ProSe direct communication capable UEs.

ProSe direct communication is a mode of communication whereby UEs can communicate with each other directly over the PC5 interface. This communication mode is supported when the UE is served by E-UTRAN and when the UE is outside of E-UTRA coverage. Only those UEs authorized to be used for public safety operation can perform ProSe direct communication.

In order to perform synchronization for out of coverage operation, UE(s) may act as a synchronization source by transmitting SBCCH and a synchronization signal. SBCCH carries the most essential system information needed to receive other ProSe channels and signals. SBCCH along with synchronization signal is transmitted with a fixed periodicity of 40 ms. When the UE is in network coverage, the contents of SBCCH are derived from the parameters signaled by the eNB. When the UE is out of coverage, if the UE selects another UE as a synchronization reference, then the content of SBCCH is derived from the received SBCCH. Otherwise, UE uses pre-configured parameters. System information block (SIB) 18 provides the resource information for synchronization signal and SBCCH transmission. There are two pre-configured subframes every 40 ms for out of coverage operation. UE receives synchronization signal and SBCCH in one subframe and transmit synchronization signal and SBCCH on another subframe if UE becomes synchronization source.

UE performs Prose direct communication on subframes defined over the duration of sidelink control period. The sidelink control period is the period over which resources allocated in a cell for sidelink control and sidelink data transmissions occur. Within the sidelink control period, the UE sends a sidelink control followed by sidelink data. Sidelink control indicates a layer 1 ID and characteristics of the transmissions (e.g. MCS, location of the resource(s) over the duration of sidelink control period, timing alignment).

The UE performs transmission and reception of Uu and PC5 with the following decreasing priority order:
Uu transmission/reception (highest priority)
PC5 ProSe direct communication transmission/reception
PC5 ProSe direct discovery transmission/reception (lowest priority)

Figure 6:
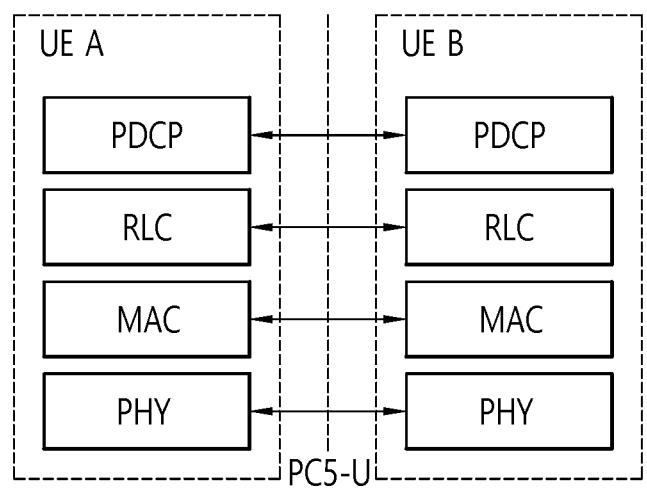
FIG. 6 shows a user plane protocol stack for ProSe direct communication.

FIG. 6 shows a user plane protocol stack for ProSe direct communication. Referring to FIG. 6, PDCP, RLC and MAC sublayers (terminate at the other UE) perform the functions listed for the user plane. The AS protocol stack in the PC5-U interface consists of PDCP, RLC, MAC and PHY.

There is no HARQ feedback for ProSe direct communication. RLC unacknowledged mode (UM) is used for ProSe direct communication. A receiving UE needs to maintain at least one RLC UM entity per transmitting peer UE. A receiving RLC UM entity used for ProSe direct communication does not need to be configured prior to reception of the first RLC unacknowledged mode data (UMD) protocol data unit (PDU). Robust header compression (ROHC) unidirectional mode is used for header compression in PDCP for ProSe direct communication.

A UE may establish multiple logical channels. Logical channel ID (LCID) included within the MAC subheader uniquely identifies a logical channel within the scope of one source Layer-2 ID and ProSe layer-2 group ID combination. Parameters for logical channel prioritization are not configured.

Figure 7:
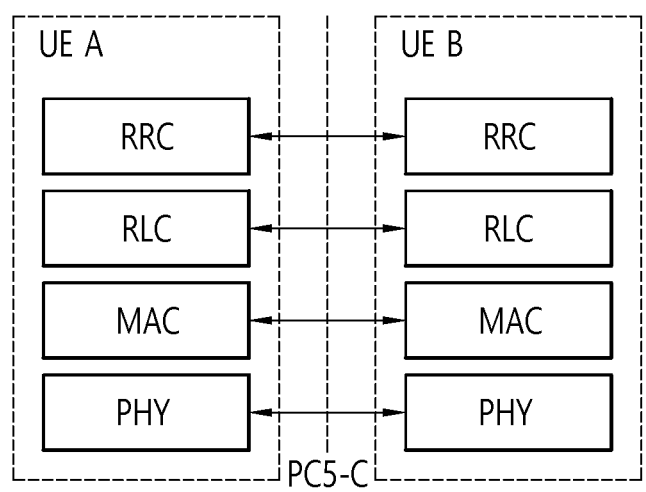
FIG. 7 shows a control plane protocol stack for ProSe direct communication.

FIG. 7 shows a control plane protocol stack for ProSe direct communication. Referring to FIG. 7, PDCP, the AS protocol stack for SBCCH in the PC5-C interface consists of RRC, RLC, MAC and PHY. A UE does not establish and maintain a logical connection to receiving UEs prior to a ProSe direct communication.

For ProSe direct communication, the UE supporting ProSe direct communication can operate in two modes for resource allocation, which include Mode 1 (scheduled resource allocation) and Mode 2 (UE autonomous resource selection). In Mode 1, the UE needs to be RRC_CONNECTED in order to transmit data. The UE requests transmission resources from the eNB. The eNB schedules transmission resources for transmission of sidelink control and data. The UE sends a scheduling request (dedicated scheduling request (D-SR) or random access) to the eNB followed by a ProSe buffer status report (BSR). Based on the ProSe BSR, the eNB can determine that the UE has data for a ProSe direct communication transmission and estimate the resources needed for transmission. The eNB can schedule transmission resources for ProSe direct communication using configured sidelink radio network temporary identifier (SL-RNTI). In Mode 2, a UE on its own selects resources from resource pools and performs transport format selection to transmit sidelink control and data.

A UE in RRC_CONNECTED may send a ProSe UE Information indication to eNB when UE becomes interested in ProSe Direct Communication. In response eNB may configure the UE with a SL-RNTI.

A UE is considered in-coverage for ProSe direct communication whenever it detects a cell on a public safety ProSe carrier. If the UE is out of coverage for ProSe direction communication, it can only use Mode 2. If the UE is in coverage for ProSe direct communication, it may use Mode 1 or Mode 2 as per eNB configuration. If the UE is in coverage for ProSe direct communication, it shall use only Mode 1 unless one of the exceptional cases occurs. When an exceptional case occurs, the UE is allowed to use Mode 2 temporarily even though it was configured to use Mode 1. Resource pool to be used during exceptional case may be provided by eNB.

A UE that is camped or connected on one carrier frequency but interested in ProSe direct communication operation on another carrier frequency (i.e. public safety ProSe carrier) shall attempt to find cells on the public safety ProSe carrier. An RRC_IDLE UE camped on a cell in another carrier frequency, but in the coverage area of an E-UTRA cell on public safety ProSe carrier, may consider the public safety ProSe carrier to be highest priority, and reselects to the cell on the public safety ProSe carrier. UE may consider a frequency (non-public safety ProSe carrier) to be highest priority if it can perform ProSe direct communication only while camping on the frequency.

An RRC_CONNECTED UE served by a cell in another carrier frequency may send a ProSe UE Information indication to its serving cell when it wants to perform ProSe direct communication. The indication contains the intended public safety ProSe carrier. The serving cell indicates with the presence of SIB 18 whether the UE is allowed to send the ProSe UE Information indication. The serving cell may configure an inter-frequency radio resource management (RRM) measurement on the public safety ProSe carrier. Once the UE enters coverage of a cell on the public safety ProSe carrier, based on measurement report, the eNB performs inter-frequency mobility to the public safety ProSe carrier. If inter-frequency mobility is not performed by the serving cell, or if it fails, the UE may still perform ProSe direct communication using Mode 2 from the resource pools, if any, broadcasted by the detected E-UTRA cell on the public safety ProSe carrier.

If the UE does not detect an E-UTRA cell on the public safety ProSe carrier, the UE can use public safety ProSe carrier resources preconfigured in the universal integrated circuit card (UICC) or mobile equipment (ME) for out of coverage ProSe direct communication. If the UE detects an E-UTRA cell on the public safety ProSe carrier, the UE stops using resources preconfigured in the UICC or ME. UE may use Mode 2 from the resource pools, if any, broadcasted by the detected E-UTRA cell on the public safety ProSe carrier. For Rel-12, all ProSe communication (for a UE) is performed on a single preconfigured public safety ProSe carrier, which is valid in the operating region. Higher layers check validity of the public safety ProSe carrier in the operating region.

The cell on the public safety ProSe carrier may provide a transmission resource pool for Mode 2 in SIB 18. UEs that are authorized for Prose direct communication may use these resources for ProSe direct communication in RRC_IDLE in the cell in the same carrier (i.e. public safety ProSe carrier). UEs that are authorized for ProSe direct communication may use these resources for ProSe direct communication in RRC_IDLE in the cell on the same carrier (i.e. public safety ProSe carrier). UEs that are authorized for ProSe direct communication may use these resources for ProSe direct communication in RRC_IDLE or RRC_CONNECTED in a cell on another carrier.

Alternatively, the cell on the public safety ProSe carrier may indicate in SIB 18 that it supports ProSe direct communication but does not provide transmission resources. UEs need to enter RRC_CONNECTED to perform ProSe direct communication transmission. In this case, the cell on the public safety ProSe carrier may provide, in broadcast signaling, an exceptional transmission resource pool for Mode 2, to be used by the UE in exceptional cases. A UE in RRC_CONNECTED that is authorized to perform ProSe direct communication transmission indicates to the serving eNB that it wants to perform ProSe direct communication transmissions. The eNB validates whether the UE is authorized for ProSe direct communication transmission using the UE context received from MME. The eNB may configure a UE by dedicated signaling with a transmission resource pool for Mode 2. That may be used without constraints while the UE is RRC_CONNECTED. Alternatively, the eNB may configure a UE to use the exceptional transmission resource pool for Mode 2 which the UE is allowed to use only in exceptional cases, and rely on scheduled resource allocation otherwise.

The resource pools for sidelink control when the UE is out of coverage are pre-configured for reception and transmission. The resource pools for sidelink control when the UE is in coverage for ProSe direct communication are configured as below. The resource pool used for reception is configured by the eNB via RRC, in broadcast signaling. The resource pool used for transmission is configured by the eNB via RRC, in dedicated or broadcast signaling, if Mode 2 is used.

The resource pool used for transmission is configured by the eNB via RRC, in dedicated signaling, if Mode 1 is used. The eNB schedules the specific resource(s) for sidelink control transmission within the configured reception pool. In order to perform communication even when some UEs are in-coverage and some UEs are out of coverage, all UEs (i.e. both in and out of coverage) should be configured with reception resource pools for sidelink control which are the union of the resource pools used for transmission of sidelink control in the serving cell and neighbor cells and transmission of sidelink control for out of coverage.

The resource pools for data when the UE is out of coverage for ProSe direct communication are pre-configured for reception and transmission. The resource pools for data when the UE is in coverage for ProSe direct communication are configured by the eNB via RRC, in dedicated or broadcast signaling, if Mode 2 is used, for reception and transmission. There is no resource pool for transmission if Mode 1 is used.

ProSe direct discovery is defined as the procedure used by the UE supporting ProSe direct discovery to discover other UE(s) in its proximity, using E-UTRA direct radio signals via PC5. ProSe direct discovery is supported only when the UE is served by E-UTRAN. Upper layer handles authorization for announcement and monitoring of discovery message. Content of discovery message is transparent to AS and no distinction in AS is made for ProSe direct discovery models and types of ProSe direct discovery. The ProSe protocol ensures that only valid discovery messages are delivered to AS for announcement.

The UE can participate in announcing and monitoring of discovery message in both RRC_IDLE and RRC_CONNECTED states as per eNB configuration. The UE announces and monitors its discovery message subject to the half-duplex constraint. The UE that participates in announcing and monitoring of discovery messages maintains the current coordinated universal time coordinated (UTC) time. The UE that participates in announcing transmits the discovery message which is generated by the ProSe protocol taking into account the UTC time upon transmission of the discovery message. In the monitoring UE, the ProSe protocol provides the message to be verified together with the UTC time upon reception of the message to the ProSe function.

In order to perform synchronization, UE(s) participating in announcing of discovery messages may act as a synchronization source by transmitting a synchronization signal based on the resource information for synchronization signals provided in SIB19.

There are three range classes. Upper layer authorization provides applicable range class of the UE. Maximum allowed transmission power for each range class is signaled in SIB 19. UE uses the applicable maximum allowed transmission power corresponding to its authorized range class. This puts an upper limit on the determined transmit power based on open loop power control parameters.

Figure 8:
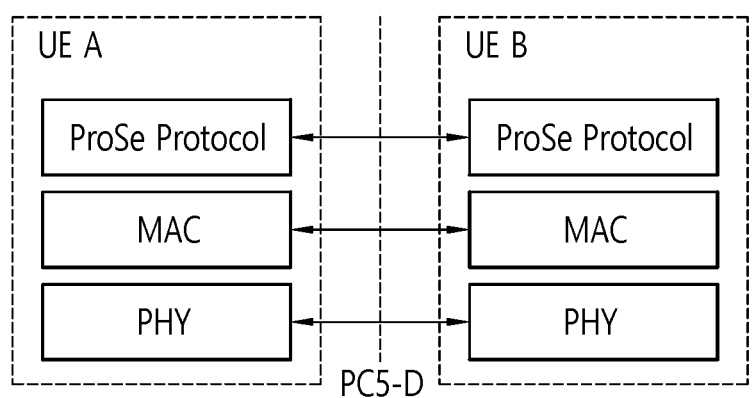
FIG. 8 shows PC5 interface for ProSe direct discovery.

FIG. 8 shows PC5 interface for ProSe direct discovery. Referring to FIG. 8, UE A and UE B perform ProSe direct discovery using ProSe protocol via PC5-D. Radio protocol stack (AS) for ProSe direct discovery consists of only MAC and PHY. The AS layer performs function of interfaces with upper layer (ProSe Protocol). The MAC layer receives the discovery message from the upper layer (ProSe Protocol). The IP layer is not used for transmitting the discovery message. The AS layer also performs function of scheduling. The MAC layer determines the radio resource to be used for announcing the discovery message received from upper layer. The AS layer also performs function of discovery PDU generation. The MAC layer builds the MAC PDU carrying the discovery message and sends the MAC PDU to the physical layer for transmission in the determined radio resource. No MAC header is added.

There are two types of resource allocation for discovery message announcement, which include Type 1 (UE autonomous resource selection) and Type 2 (scheduled resource allocation). Type 1 is a resource allocation procedure where resources for announcing of discovery message are allocated on a non UE specific basis. In Type 1, the eNB provides the UE(s) with the resource pool configuration used for announcing of discovery message. The configuration may be signaled in broadcast or dedicated signaling. The UE autonomously selects radio resource(s) from the indicated resource pool and announce discovery message. The UE can announce discovery message on a randomly selected discovery resource during each discovery period. Type 2 is a resource allocation procedure where resources for announcing of discovery message are allocated on per UE specific basis. In Type 2, the UE in RRC_CONNECTED may request resource(s) for announcing of discovery message from the eNB via RRC. The eNB assigns resource(s) via RRC. The resources are allocated within the resource pool that is configured in UEs for monitoring.

For UEs in RRC_IDLE, the eNB may provide a resource pool for Type 1 based discovery message announcement in SIB 19. UEs that are authorized for Prose direct discovery use these resources for announcing discovery message in RRC_IDLE. Alternatively, the eNB may indicate in SIB 19 that it supports ProSe direct discovery but does not provide resources for discovery message announcement. UEs need to enter RRC_CONNECTED in order to request resources for discovery message announcement.

For UEs in RRC_CONNECTED, a UE authorized to perform ProSe direct discovery announcement indicates to the eNB that it wants to perform ProSe direct discovery announcement. The eNB validates whether the UE is authorized for ProSe direct discovery announcement using the UE context received from MME. The eNB may configure the UE with resource pool for Type 1 for discovery message announcement via dedicated signaling. The eNB may configure resource pool along with dedicated resource in the form of time and frequency indices for discovery message announcement via dedicated RRC signaling. The dedicated resources allocated by the eNB are valid until the eNB re-configures the resource(s) by RRC signaling, or the UE enters RRC_IDLE.

Authorized receiving UEs in RRC_IDLE and RRC_CONNECTED monitor resource pools used for Type 1 and resource pools for Type 2. The eNB provides the resource pool configuration used for discovery message monitoring in SIB 19. The SIB 19may contain detailed ProSe direct discovery configuration used for announcing in neighbor cells of intra-frequency as well.

Synchronous and asynchronous deployments are supported. Discovery resources can be overlapping or non-overlapping across cells.

A UE, if authorized by the network, can announce discovery message only on serving cell. The UE can monitor discovery resources in the same as well as other frequencies than the serving cell, in same or different PLMNs. The serving cell may provide in SIB 19 a list of frequencies along with PLMN ID on which the UE may aim to monitor discovery message. The serving cell does not provide detailed ProSe discovery configuration for other carrier frequencies. The UE shall read SIB 19 and other relevant SIBs on other carriers if it wants to perform discovery message monitoring on those carriers. Obtaining ProSe direct discovery configuration by reading SIB 19 (and other SIBs) of an inter-frequency and/or inter-PLMN cell shall not affect the UE's Uu reception on the serving cell(s). The UE performs intra-frequency ProSe direct discovery announcement in subframes in which a ProSe direct discovery resource pool is configured and the UE is not expected to perform uplink Uu transmission. In this case, the UE shall not create autonomous gaps. Intra-frequency, inter-frequency and inter-PLMN ProSe direct discovery monitoring shall not affect Uu reception. The UE uses DRX occasions in RRC_IDLE and RRC_CONNECTED or second RX chain if it is available, for intra-frequency, inter-frequency and inter-PLMN discovery message monitoring. The UE shall not create autonomous gaps. An RRC_CONNECTED UE sends ProSe UE Information indication to the serving cell if it is interested or no longer interested in intra-frequency, inter-frequency or inter-PLMN discovery message monitoring.

Figure 9:
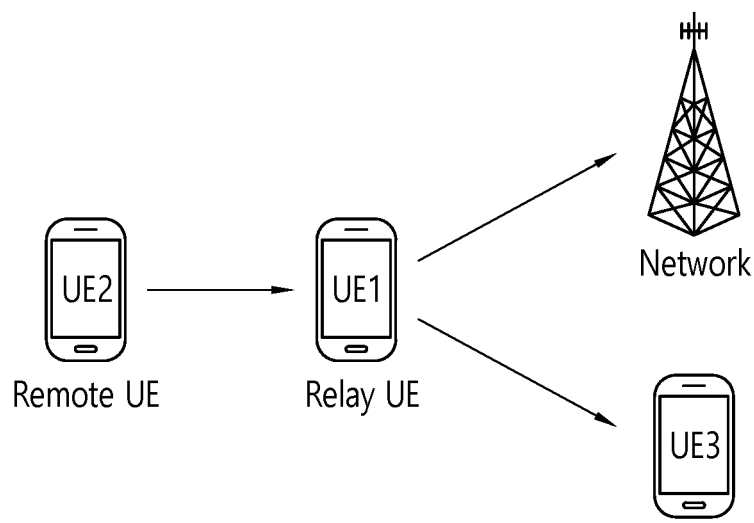
FIG. 9 shows an example of UE-to-Network Relay and UE-to-UE Relay.

FIG. 9 shows an example of UE-to-Network Relay and UE-to-UE Relay. Referring to FIG. 9, UE1 performs as a ProSe UE-to-Network Relay UE (hereinafter, relay UE). Relay UE is a UE that provides functionality to support connectivity to unicast services for remote UE(s). UE2 performs as a remote UE. Remote UE is a ProSe-enabled public safety UE that communicates with a PDN via a ProSe UE-to-Network Relay. That is, UE1, i.e. relay UE, receives from control signal/data from UE2, i.e. remote UE, which is required to be relayed to the network or another UE, i.e. UE3. If the control signal/data is relayed to the network, it may consist of UE-to-Network Relay. If the control signal/data is relayed to UE3, it may consist of UE-to-UE Relay.

From the perspective of the remote UE, there may be some data which needs to be relayed to the network and some data which does not need to be relayed to the network, among one-to-many communication. Further, from the perspective of the remote UE, there may be many number of candidate relay UEs which can be a relay UE for the remote UE. Currently, it is not possible for the relay UE to determine whether the data received from the remote UE is required to be relayed or not. Further, currently for the remote UE, it is not defined how to select the relay UE among many number of candidate relay UEs, or how to indicate which UE is in charge of relaying data of the remote UE.

In the description below, UE-to-Network Relay may be focused for the convenience, however, the present invention is not limited to thereto. The present invention described below may be applied to UE-to-UE Relay as well. Relay may refer to UE-to-UE relay as well as UE-to-Network Relay in the description below. Further, it is assumed that UE1 (receiver UE) is relay UE that can provide the relay service and UE2 (transmitter UE) is a remote UE that wants to get the relay service. Further, there may be two types of relay services, one of which is a relay service for 1:M data transmitted by remote UE and the other is a relay service for 1:1 data transmitted by remote UE.

(1) First Embodiment

Figure 10:
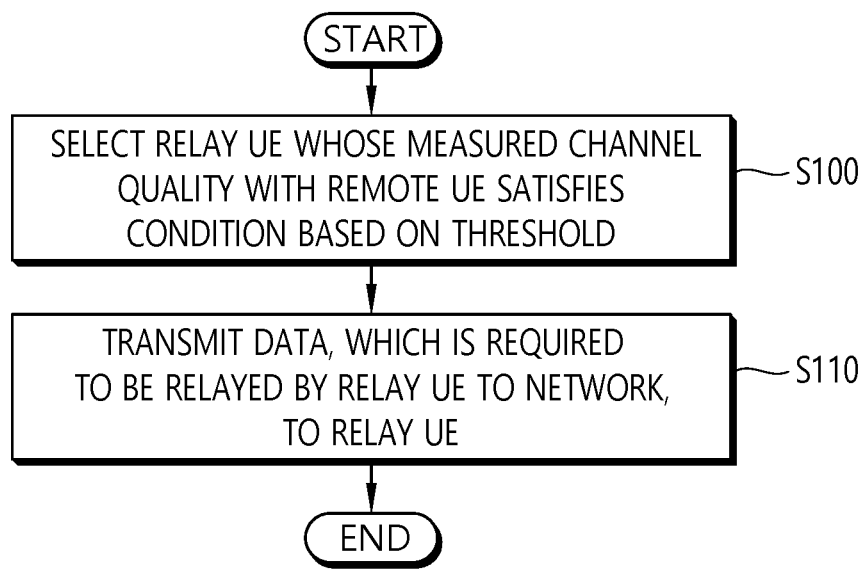
FIG. 10 shows a method for selecting a relay UE according to an embodiment of the present invention.

FIG. 10 shows a method for selecting a relay UE according to an embodiment of the present invention.

In step S100, the remote UE selects a relay UE whose measured channel quality (e.g. sidelink reference signal received power (S-RSRP)) with the remote UE (i.e. measurement result between the remote UE and candidate relay UEs) satisfies a condition based on a threshold. The remote UE may perform radio measurement at PC5 interface and uses it for ProSe UE-to-Network Relay selection along with higher layer criterion. The condition may include that the measured channel quality with the remote UE exceeds the threshold. That is, a relay UE may be considered suitable in terms of radio criteria if the PC5 link quality exceeds configured threshold (pre-configured or provided by the network). In step S110, the remote UE transmits data, which is required to be relayed by the relay UE to a network, to the relay UE.

The relay UE may be selected among all candidate relay UEs whose measured channel quality (e.g. S-RSRP) with the remote UE satisfy the condition based on the threshold, For example, a candidate relay UE, which has the best measured channel quality among all the candidate relay UEs, may be selected as the relay UE. That is, the remote UE may select the ProSe UE-to-Network Relay UE, which satisfies higher layer criterion and has best PC5 link quality among all suitable ProSe UE-to-Network relay UEs.

In the above description for the embodiment of FIG. 10, it is described that the condition relates to measurement result between the remote UE and candidate relay UEs. However, the present invention is not limited to thereto, and various other conditions may be used for selecting the relay UE. For example, the current synchronization reference UE may be selected as the relay UE. Alternatively, if multi-hop relaying is supported, the UE which has the least hop to the network (in case of UE-to-Network Relay) or the destined UE (in case of UE-to-UE Relay) may be selected as the relay UE. Alternatively, the UE which relays the interesting service (e.g. interested MBMS service) may be selected as the relay UE.

When the remote UE selects the relay UE, the remote UE may configure or select the relay UE as the synchronization reference UE, regardless of the priority of the configured (selected) synchronization reference UE.

(2) Second Embodiment

Figure 11:
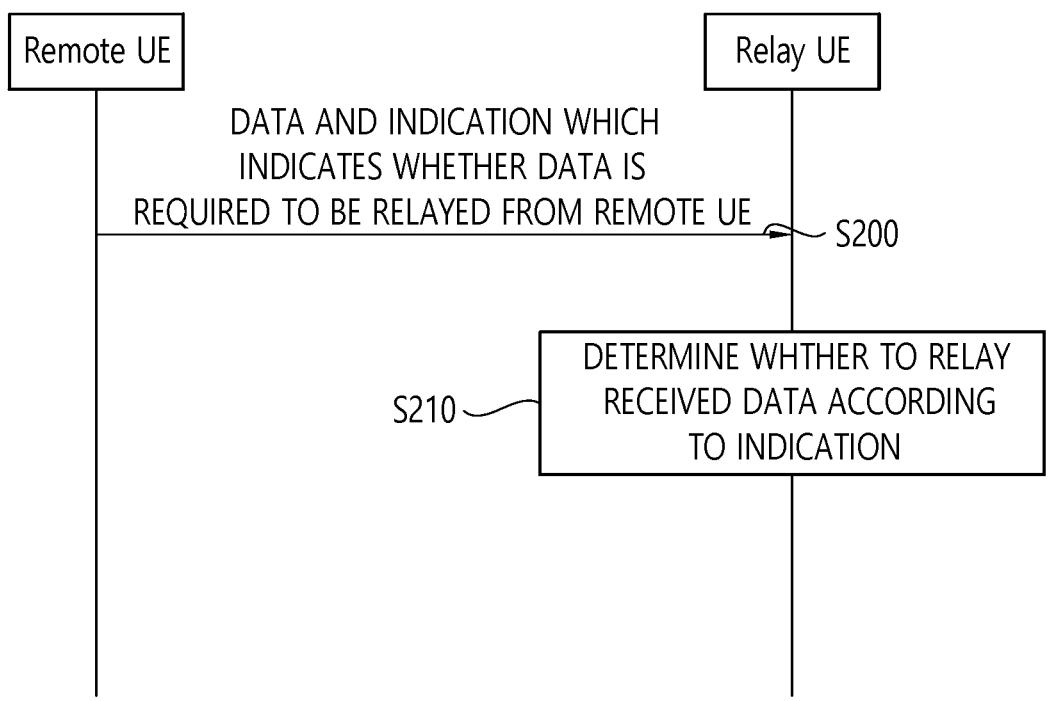
FIG. 11 shows a method for transmitting an indication according to an embodiment of the present invention.

FIG. 11 shows a method for transmitting an indication according to an embodiment of the present invention. In this embodiment, it is assumed that the remote UE is aware of whether there is the relay UE within the transmission range of the remote UE. Further, this embodiment may be applied to relay service for one-to-many/one-to-one data transmitted by the remote UE.

In step S200, the remote UE transmits data and an indication which indicates whether the data is required to be relayed. That is, the remote UE may indicate to the relay UE whether the remote UE wants the data to be relayed to the network (in case of UE-to-Network Relay) or other UEs (in case of UE-to-UE Relay). The indication may include one bit indication which denotes whether the received data (or associated data) is required to be relayed by the relay UE. The indication may also denotes whether the remote UE wants the received data (or associated data) to be relayed. The absence of the one bit indication may indicate that the received data does not need to be relayed.

The indication may be transmitted to the relay UE via one of sidelink control information (SCI), a reserved bit in SL-SCH MAC PDU (sub)header, a new MAC control element (CE) included in sidelink, or an RRC message transmitted on SBCCH (e.g. relay indicator per destination ID which indicates that for each potential relay UE is relay for the remote UE). Further, the indication may be included in every message for ProSe direct communication as well as ProSe direct discovery performed via PC5.

In step S210, the relay UE determines whether to relay the received data according to the received indication which indicates whether the data is required to be relayed. After receiving the data transmitted to the group to which the relay UE belongs (in case of one-to-many communication) or receiving the data transmitted to the relay UE (in case of one-to-one communication), the relay UE may determine whether to relay the received data. If the received indication denotes that the received data needs to be relayed, the relay UE may forward the received data to the network (in case of UE-to-Network Relay) or other UEs (in case of UE-to-UE Relay) and may deliver the received data to the upper layer of the relay UE. Otherwise, i.e. the received indication denotes that the received data does not need to be relayed or the indication is absent, the relay UE may deliver the received data to the upper layer of the relay UE and may not forward the received data.

(3) Third Embodiment

The embodiment of FIG. 11 may be further enhanced for the scenario where there are multiple relay UEs within transmission range of the remote UE. If there are multiple relay UEs near the remote UE, it is possible that none of the multiple relay UEs relays the received data or the multiple relay UEs relays the data redundantly.

Figure 12:
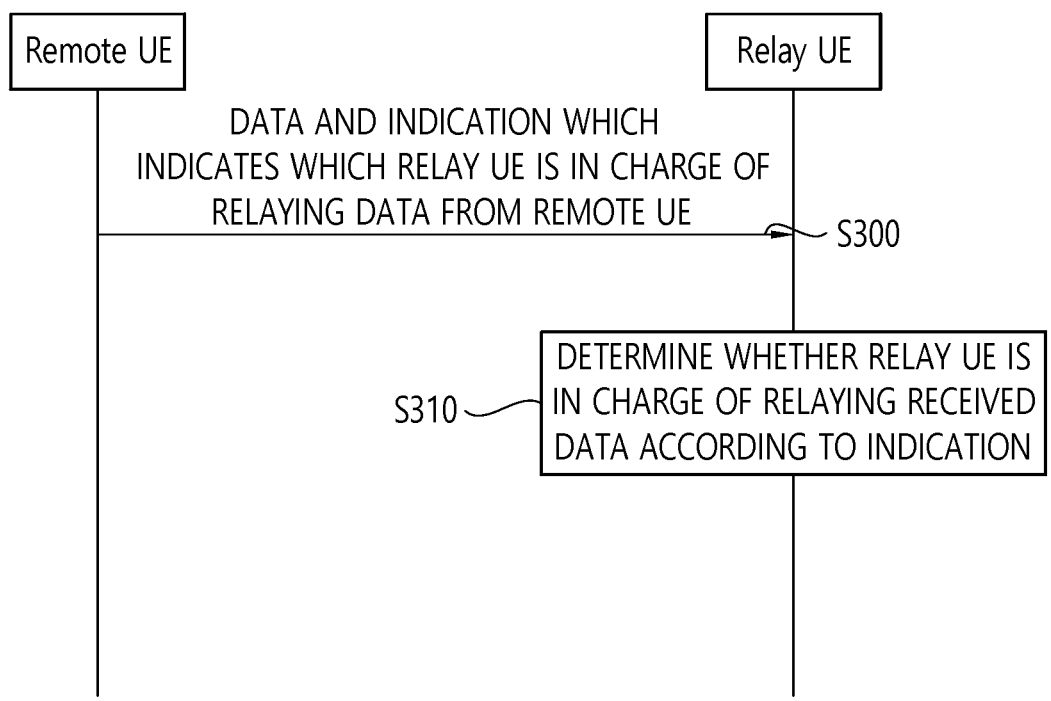
FIG. 12 shows a method for transmitting an indication for according to another embodiment of the present invention.

FIG. 12 shows a method for transmitting an indication for according to another embodiment of the present invention. In this embodiment, it is assumed that the remote UE is aware that there are multiple relay UEs within the transmission range of the remote UE. Further, this embodiment may be applied to relay service for one-to-many data transmitted by the remote UE.

In step S300, the remote UE transmits data and an indication which relay UE is in charge of relay data. The indication may be an ID of the relay UE. The ID may be full relay UE ID, or a part of relay UD ID (e.g. a few MSB/LSB bits of relay UE ID). The indication may be transmitted to the relay UE via one of SCI, a reserved bit in SL-SCH MAC PDU (sub)header, a new MAC CE included in sidelink, or an RRC message transmitted on SBCCH (e.g. relay indicator per destination ID which indicates that for each potential relay UE is relay for the remote UE).

In step S310, the relay UE determines whether the relay UE itself is in charge of relaying received data from the remote UE. After receiving the data transmitted to the group to which the relay UE belongs, the relay UE may determine whether the relay UE itself is in charge of relaying the received data from the remote UE. If the received indication denotes the relay UE ID (or a part of the relay UE ID), the relay UE may forward the received data to the network (in case of UE-to-Network Relay) or other UEs (in case of UE-to-UE Relay) and may deliver the received data to the upper layer of the relay UE. Otherwise, i.e. the received indication does not denotes the relay UE ID (or a part of the relay UE ID) or the indication is absent, the relay UE may deliver the received data to the upper layer of the relay UE and may not forward the received data.

Figure 13:
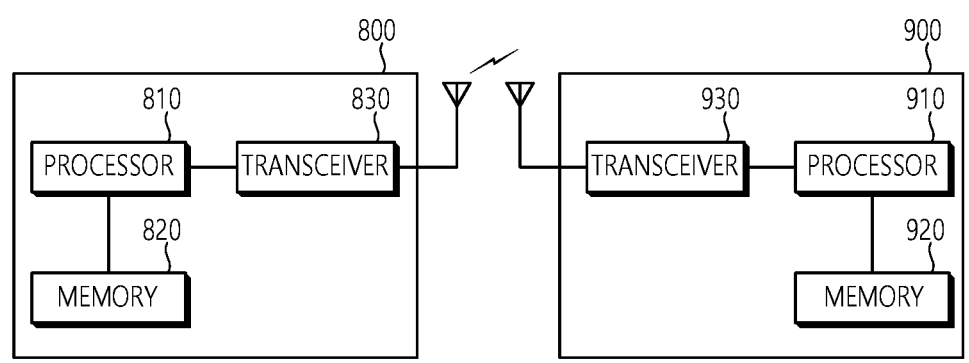
FIG. 13 shows a wireless communication system to implement an embodiment of the present invention.

FIG. 13 shows a wireless communication system to implement an embodiment of the present invention.

A remote UE 800 may include a processor 810, a memory 820 and a transceiver 830. The processor 810 may be configured to implement proposed functions, procedures and/or methods described in this description. That is, the processor 810 may select a relay UE whose measured channel quality (e.g. S-RSRP) with the remote UE satisfies a condition based on a threshold, which is described in the first embodiment by referring to FIG. 10. Further, the processor 810 may control the transceiver 830 to transmit data and an indication which indicates whether the data is required to be relayed, which is described in the second embodiment by referring to FIG. 11. Further, the processor 810 may control the transceiver 830 to transmit data and an indication which relay UE is in charge of relay data, which is described in the third embodiment by referring to FIG. 12. Layers of the radio interface protocol may be implemented in the processor 810. The memory 820 is operatively coupled with the processor 810 and stores a variety of information to operate the processor 810. The transceiver 830 is operatively coupled with the processor 810, and transmits and/or receives a radio signal. The transceiver 830 may transmit data and/or indication described above.

A relay UE 900 may include a processor 910, a memory 920 and a transceiver 930. The processor 910 may be configured to implement proposed functions, procedures and/or methods described in this description. That is, the processor 910 may determine whether to relay the received data according to the received indication which indicates whether the data is required to be relayed, which is described in the second embodiment by referring to FIG. 11. Further, the processor 910 may determine whether the relay UE itself is in charge of relaying received data from the remote UE, which is described in the third embodiment by referring to FIG. 12. Layers of the radio interface protocol may be implemented in the processor 910. The memory 920 is operatively coupled with the processor 910 and stores a variety of information to operate the processor 910. The transceiver 930 is operatively coupled with the processor 910, and transmits and/or receives a radio signal.

The processors 810, 910 may include application-specific integrated circuit (ASIC), other chipset, logic circuit and/or data processing device. The memories 820, 920 may include read-only memory (ROM), random access memory (RAM), flash memory, memory card, storage medium and/or other storage device. The transceivers 830, 930 may include baseband circuitry to process radio frequency signals. When the embodiments are implemented in software, the techniques described herein can be implemented with modules (e.g., procedures, functions, and so on) that perform the functions described herein. The modules can be stored in memories 820, 920 and executed by processors 810, 910. The memories 820, 920 can be implemented within the processors 810, 910 or external to the processors 810, 910 in which case those can be communicatively coupled to the processors 810, 910 via various means as is known in the art.

In view of the exemplary systems described herein, methodologies that may be implemented in accordance with the disclosed subject matter have been described with reference to several flow diagrams. While for purposed of simplicity, the methodologies are shown and described as a series of steps or blocks, it is to be understood and appreciated that the claimed subject matter is not limited by the order of the steps or blocks, as some steps may occur in different orders or concurrently with other steps from what is depicted and described herein. Moreover, one skilled in the art would understand that the steps illustrated in the flow diagram are not exclusive and other steps may be included or one or more of the steps in the example flow diagram may be deleted without affecting the scope and spirit of the present disclosure.

What is claimed is:

1. A method performed by a remote user equipment (UE) in a wireless communication system, the method comprising:

selecting a relay UE among all candidate relay UEs whose measured channel quality satisfies a condition based on a threshold, wherein the relay UE has a best measured channel quality among the all candidate relay UEs;

configuring the relay UE as a synchronization reference UE regardless of a priority of the relay UE;

transmitting data, which is required to be relayed by the relay UE to a network, to the relay UE; and transmitting information to the relay UE, wherein the information informs that the data is required to be relayed by the relay UE to the network, and wherein the information is an identifier of the relay UE.

2. The method of claim 1, wherein the condition includes that the measured channel quality for a candidate relay UE exceeds the threshold.

3. The method of claim 1, wherein the measured channel quality is a sidelink reference signal received power (S-RSRP).

4. The method of claim 1, wherein the threshold is pre-configured or provided by the network.

5. The method of claim 1, wherein the information is carried in reserved bits in a sidelink control information (SCI).

6. The method of claim 1, wherein the information is carried in reserved bits in a header of a sidelink shared channel (SL-SCH) media access control (MAC) protocol data unit (PDU).

7. The method of claim 1, wherein the information is carried in reserved bits in a new MAC control element (CE) included in sidelink.

8. The method of claim 1, wherein the information is carried in reserved bits in a radio resource control (RRC) message transmitted on a sidelink broadcast control channel (SBCCH).

* * * * *